(12) United States Patent
Warnock

(10) Patent No.: US 7,609,883 B1
(45) Date of Patent: Oct. 27, 2009

(54) METHOD AND APPARATUS FOR COMPENSATING FOR UNEVEN LIGHTING IN AN IMAGE

(75) Inventor: John E. Warnock, Los Altos, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 703 days.

(21) Appl. No.: 11/248,057

(22) Filed: Oct. 11, 2005

(51) Int. Cl.
*G06K 9/40* (2006.01)
*G06T 5/00* (2006.01)

(52) U.S. Cl. .................. 382/167; 382/274; 358/461

(58) Field of Classification Search .............. 358/461
See application file for complete search history.

(56) References Cited

U.S. PATENT DOCUMENTS

| | | | |
|---|---|---|---|
| 4,934,810 A | 6/1990 | Nagele et al. | |
| 5,163,102 A | 11/1992 | Yamazaki et al. | |
| 5,208,874 A * | 5/1993 | Omura | 382/274 |
| 5,253,083 A * | 10/1993 | Hirota | 358/461 |
| 5,456,256 A | 10/1995 | Schneider et al. | |
| 5,459,592 A | 10/1995 | Shibatani et al. | |
| 6,011,860 A | 1/2000 | Fujieda et al. | |
| 6,151,419 A | 11/2000 | Aoki | |
| 6,637,656 B2 | 10/2003 | Kurogama et al. | |
| 2001/0033685 A1 * | 10/2001 | Ishiyama | 382/154 |
| 2006/0098894 A1 * | 5/2006 | DiCarlo et al. | 382/274 |

OTHER PUBLICATIONS

O'Quinn, Photoshop 6 Shop Manual, New Riders Publishing, 2002.*
AZ Kouzani, "A Fuzzy Neural Network For Extracting Facial Patterns" 2003 IEEE XIII Workshop on Neural Networks for Signal Processing, pp. 699-708, 2003.*
Assarsson, Akenine-Moller, "A Geometry-Based Soft Shadow Volume Algorithm Using Graphics Hardware", Jul. 2003 ACM Transactions on Graphics, ACM SIGGRAPH 2003 Papers SIGGRAPH '03 vol. 22, Issue 3.

* cited by examiner

*Primary Examiner*—Jon Chang
(74) *Attorney, Agent, or Firm*—Robert C. Kowert; Meyertons, Hood, Kivlin, Kowert & Goetzel, P.C.

(57) ABSTRACT

A system that compensates for uneven lighting in a digital image of a surface. During operation, the system receives the digital image of the surface. Next, the system obtains a reference lighting map for the surface, which contains information about the lighting of the surface at the time the digital image was acquired. The system then uses the reference lighting map to compensate for uneven lighting in the digital image.

13 Claims, 4 Drawing Sheets
(3 of 4 Drawing Sheet(s) Filed in Color)

METHOD AND APPARATUS FOR COMPENSATING FOR UNEVEN LIGHTING IN AN IMAGE

BACKGROUND

1. Field of the Invention

The present invention relates generally to the field of image processing. More specifically, the present invention relates to a method and apparatus for using a reference lighting map to compensate for uneven lighting in an image of a surface.

2. Related Art

Digital scanner and color printer technology have advanced to the point where it is possible to make high quality copies of color photographs and color documents. Unfortunately, some documents cannot be scanned using a scanner. For example, a visitor to a museum cannot scan a historical document or a painting on display.

One technique to capture images of documents that cannot be scanned is to take a high-quality photograph and to digitally scan the photograph. Another technique is to use a high-resolution digital camera to capture an image of the document. Unfortunately, unlike a digital scanner, a digital camera does not provide an even light source to the document to be scanned. Instead, the digital camera relies on the ambient lighting and/or a flash-lamp to illuminate the document while capturing an image of it. Therefore, images captured using these techniques typically exhibit uneven lighting, even if care is taken when positioning the camera to take a picture of the document.

Hence, what is needed is a method and an apparatus for correcting for uneven lighting in an image of a surface.

SUMMARY

One embodiment of the present invention provides a system that compensates for uneven lighting in a digital image of a surface. During operation, the system receives the digital image of the surface. Next, the system obtains a reference lighting map for the surface, which contains information about the lighting of the surface at the time the digital image was acquired. The system then uses the reference lighting map to compensate for uneven lighting in the digital image.

In a variation on this embodiment, while obtaining the reference lighting map for the surface, the system captures an image of a reference plane under similar lighting conditions as when the digital image of the surface was acquired.

In a further variation, the reference plane has constant color.

In a variation on this embodiment, while using the reference lighting map to compensate for uneven lighting in the digital image, the system inverts the colors in the reference lighting map to produce an inverted reference lighting map. Next, the system overlays the inverted reference lighting map over the digital image of the surface. The system then adjusts colors in the digital image by using color information in the inverted reference lighting map to compensate for uneven lighting in the digital image.

In a variation on this embodiment, the system adjusts the brightness of the inverted reference lighting map prior to using the reference lighting map to compensate for uneven lighting in the digital image.

In a variation on this embodiment, if the surface has a curvature, while obtaining the reference lighting map, the system captures an image of a reference plane with a similar curvature.

In a variation on this embodiment, the reference lighting map is selected from a library of pre-generated reference lighting maps based on the lighting conditions under which the digital image of the surface was acquired.

In a variation on this embodiment, obtaining the reference lighting map involves digitally generating the reference lighting map based on a lighting model.

In a variation on this embodiment, while digitally generating the reference lighting map, the system uses a lighting model which accounts for: (1) characteristics of the light source; (2) the angle and the distance of the light source from the surface; (3) characteristics of the surface; and (4) the angle and the distance of the capture device from the surface.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Compensating for Uneven Lighting Using Adobe® Photoshop®

The process for compensating for uneven lighting can be accomplished using a digital camera and Adobe® Photoshop® as follows. First, capture an image of the document using the digital camera. Next, replace the document with a white sheet of poster board. Note that the poster board is placed at the same distance and the same angle that the original document was from the digital camera. Also note that the poster board can be replaced with any other surface which has similar surface characteristics (e.g., texture, reflectivity and curvature) as the document being captured. Note that the poster board is ideally subject to the same lighting conditions from the same lighting sources as the original image.

Next, capture an image of the white sheet of poster board using the digital camera. This image will serve as the reference lighting map.

After these images have been captured, open the digital image in Adobe® Photoshop® and create a new layer. Then open the image of the reference lighting map. Next, select all and copy the reference lighting map to the new layer. Invert the image in the new layer by using the command sequence Image-Adjustments-Invert. Then select "Color Dodge" from the layers palette with opacity of 100% to compensate for uneven lighting in the digital image.

Note that Color Dodge looks at the color information in each channel of the inverted reference lighting map and brightens the base color (the background layer) to reflect the blend color (the inverted reference lighting map layer). Also note that blending with black produces no change.

Figure 2:
FIG. 2 presents an image of a surface captured with a digital camera in accordance with an embodiment of the present invention.

FIG. 2 presents an image of a surface captured with a digital camera in accordance with an embodiment of the present invention. Note that the surface of the digital image has uneven lighting. For example, the bottom section of the digital image is darker than the top section of the digital image.

Figure 3:
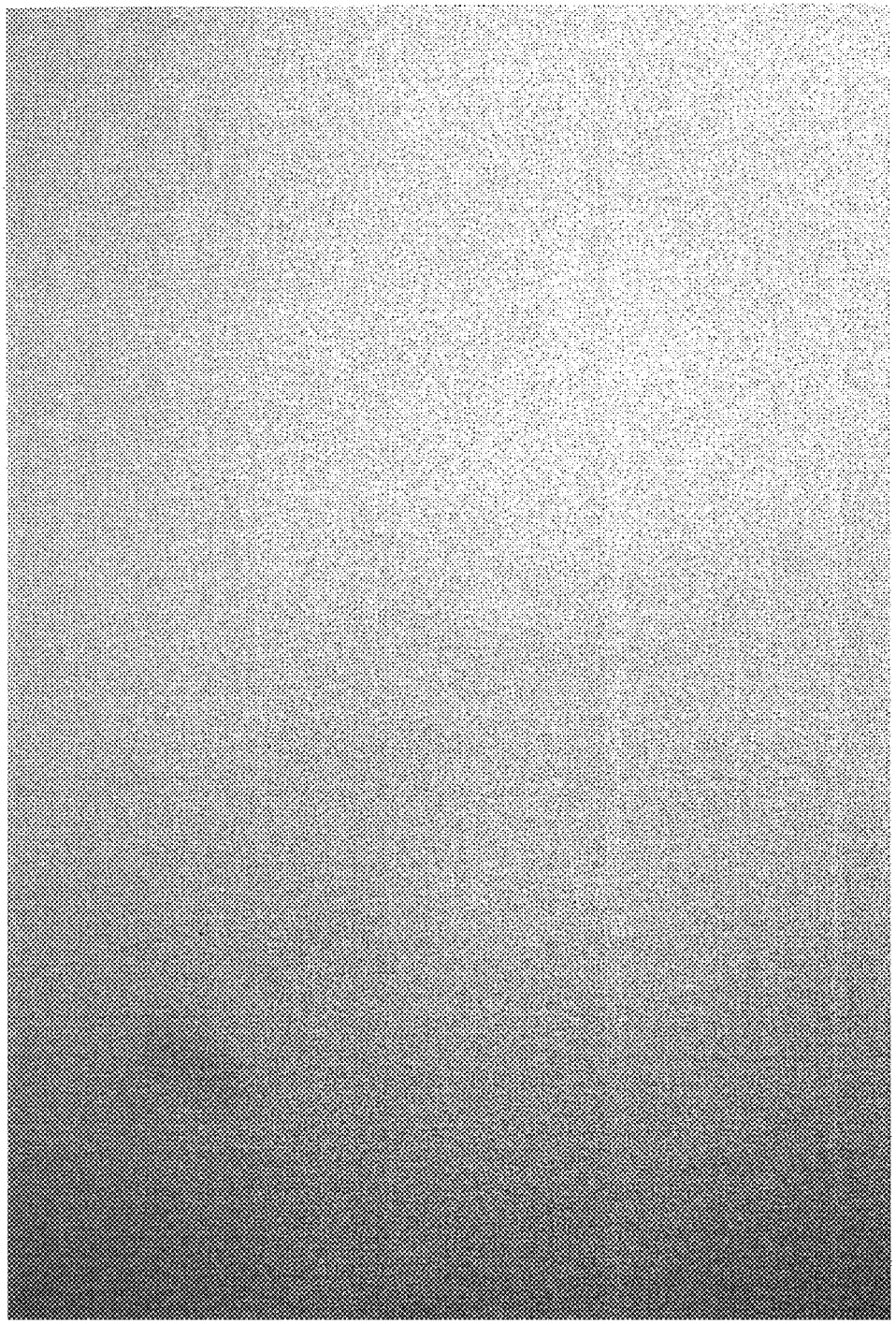
FIG. 3 presents an image of a reference plane captured with a digital camera in accordance with an embodiment of the present invention.

FIG. 3 presents an image of a reference plane captured with a digital camera in accordance with an embodiment of the present invention. Note that the reference plane exhibits similar lighting characteristics as the digital image in FIG. 2. For example, the bottom section of the reference plane in FIG. 3 is also darker than the top section of the digital image.

Figure 4:
FIG. 4 presents the image of the surface after compensating for uneven lighting in accordance with an embodiment of the present invention.

FIG. 4 presents the resulting image of the surface after compensating for uneven lighting in accordance with an embodiment of the present invention. Note that the unevenness in the lighting is substantially reduced.

High-Level Description

At a high level, the present invention provides a technique that compensates for uneven lighting when capturing digital images of a surface. This surface can be a picture of a page in a book, a poster, a painting, a document, or any other surface.

Figure 1:
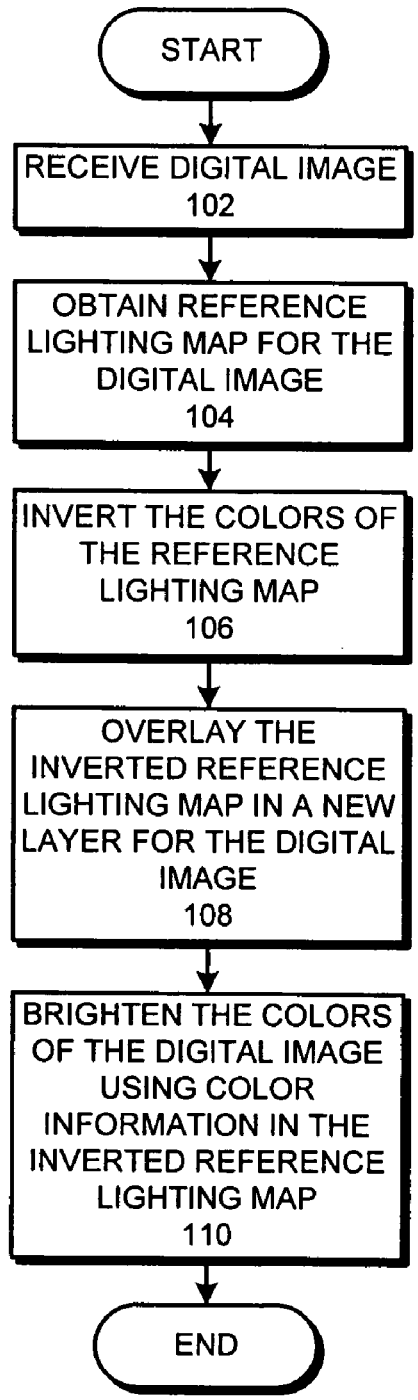
FIG. 1 presents a flow chart illustrating the process of correcting uneven lighting when capturing images of a surface in accordance with an embodiment of the present invention.

FIG. 1 presents a flow chart illustrating the process of correcting uneven lighting when capturing images of a surface in accordance with an embodiment of the present invention. The process begins when the system receives a digital image (step 102). Next, the system obtains a reference lighting map for the digital image (step 104). The system then inverts the colors of the reference lighting map (step 106). Next, the system overlays the inverted reference lighting map in a new layer for the image (step 108). The system then brightens the colors of the digital image using color information in the inverted reference lighting map (step 110).

In one embodiment of the present invention, prior to using the reference lighting map to compensate for uneven color, the system and/or the user can adjust the brightness of the reference lighting map to further compensate for uneven lighting in the digital image.

Computer-Generated Reference Lighting Map

The reference lighting map can alternatively be generated within a computer by using a model that accounts for characteristics of the light source, the angle and the distance of the light source, characteristics of the surface, and the angle and the distance of the capture device from the surface. In one embodiment of the present invention, the reference lighting map is selected from a library of pre-generated reference lighting maps based on the characteristics of the digital image.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for applying lighting characteristics to a digital image of a surface, comprising:
    receiving the digital image of the surface;
    obtaining a reference lighting map for the surface, wherein the reference lighting map contains information specifying lighting characteristics of the surface when the digital image was captured; and
    using the reference lighting map to apply the lighting characteristics to the digital image of the surface, wherein to apply the lighting characteristics to the digital image of the surface involves compensating for uneven lighting in the digital image of the surface, and wherein said compensating involves:
        inverting the colors in the reference lighting map to produce an inverted reference lighting map;
        adjusting the brightness of the inverted reference lighting map;
        overlaying the adjusted inverted reference lighting map over the digital image of the surface; and
        adjusting colors in the digital image by using color information of the adjusted inverted reference lighting map to compensate for uneven lighting in the digital image.

2. The method of claim 1, wherein obtaining the reference lighting map for the surface involves capturing an image of a reference plane under similar lighting conditions as when the digital image of the surface was captured.

3. The method of claim 2, wherein the reference plane has constant color.

4. The method of claim 2, wherein the surface has a curvature, and wherein obtaining the reference lighting map involves capturing an image of a reference plane with a similar curvature.

5. A method for applying lighting characteristics to a digital image of a surface, comprising:
    receiving the digital image of the surface;
    obtaining a reference lighting map for the surface, wherein the reference lighting map contains information specifying lighting characteristics of the surface when the digital image was captured and is selected from a library of pre-generated reference lighting maps based on the lighting conditions under which the digital image of the surface was captured; and
    using the reference lighting map to apply the lighting characteristics to the digital image of the surface.

6. A method for applying lighting characteristics to a digital image of a surface, comprising:
    receiving the digital image of the surface;
    obtaining a reference lighting map for the surface, wherein the reference lighting map contains information specifying lighting characteristics of the surface when the digital image was captured, wherein obtaining the reference lighting maps involves digitally generating the reference lighting map based on a lighting model, wherein digitally generating the reference lighting map involves using the lighting model which accounts for:
characteristics of a light source that was lighting the surface when the digital image was captured;
the angle and the distance of the light source from the surface;
characteristics of the surface; and
the angle and the distance from the surface of a capture device used to capture the image; and
using the reference lighting map to apply the lighting characteristics to the digital image of the surface.

7. A computer-readable storage device storing instructions that when executed by a computer cause the computer to perform a method for compensating for uneven lighting in a digital image of a surface, the method comprising:
receiving the digital image of the surface;
obtaining a reference lighting map for the surface, wherein the reference lighting map contains information specifying lighting characteristics of the surface when the digital image was captured; and
using the reference lighting map to apply the lighting characteristics to the digital image of the surface, wherein to apply the lighting characteristics to the digital image of the surface involves compensating for uneven lighting in the digital image of the surface, and wherein said compensating involves:
inverting the colors in the reference lighting map to produce an inverted reference lighting map;
adjusting the brightness of the inverted reference lighting map;
overlaying the adjusted inverted reference lighting map over the digital image of the surface; and
adjusting colors in the digital image by using color information in the adjusted inverted reference lighting map to compensate for uneven lighting in the digital image.

8. The computer-readable storage device of claim 7, wherein obtaining the reference lighting map for the surface involves capturing an image of a reference plane under similar lighting conditions as when the digital image of the surface was captured.

9. The computer-readable storage device of claim 7, wherein the reference plane has constant color.

10. The computer-readable storage device of claim 7, wherein the surface has a curvature, and wherein obtaining the reference lighting map involves capturing an image of a reference plane with a similar curvature.

11. A computer-readable storage device storing instructions that when executed by a computer cause the computer to perform a method for compensating for uneven lighting in a digital image of a surface, the method comprising:
receiving the digital image of the surface;
obtaining a reference lighting map for the surface, wherein the reference lighting map contains information specifying lighting characteristics of the surface when the digital image was captured, and wherein the reference lighting map is selected from a library of pre-generated reference lighting maps based on the lighting conditions under which the digital image of the surface was captured; and
using the reference lighting map to apply the lighting characteristics to the digital image of the surface.

12. A computer-readable storage device storing instructions that when executed by a computer cause the computer to perform a method for compensating for uneven lighting in a digital image of a surface, the method comprising:
receiving the digital image of the surface;
obtaining a reference lighting map for the surface wherein the reference lighting map contains information specifying lighting characteristics of the surface when the digital image was captured wherein obtaining the reference lighting maps involves digitally generating the reference lighting map based on a lighting model, wherein digitally generating the reference lighting map involves using the lighting model which accounts for:
characteristics of a light source that was lighting the surface when the digital image was captured;
the angle and the distance of the light source from the surface;
characteristics of the surface; and
the angle and the distance from the surface of a capture device used to capture the image; and
using the reference lighting map to apply the lighting characteristics to the digital image of the surface.

13. An apparatus that applies lighting characteristics to a digital image of a surface, comprising:
a lighting-compensation mechanism configured to:
receive the digital image of the surface;
obtain a reference lighting map for the surface, wherein the reference lighting map contains information specifying lighting characteristics of the surface when the digital image was captured; and to
use the reference lighting map to apply the lighting characteristics to the digital image of the surface, wherein to apply the lighting characteristics to the digital image of the surface involves compensating for uneven lighting in the digital image of the surface, and wherein said compensating involves:
inverting the colors in the reference lighting map to produce an inverted reference lighting map;
adjusting the brightness of the inverted reference lighting map;
overlaying the adjusted inverted reference lighting map over the digital image of the surface; and
adjusting colors in the digital image by using color information in the adjusted inverted reference lighting map to compensate for uneven lighting in the digital image.

* * * * *

UNITED STATES PATENT AND TRADEMARK OFFICE
CERTIFICATE OF CORRECTION

| | | |
|---|---|---|
| PATENT NO. | : 7,609,883 B1 | Page 1 of 1 |
| APPLICATION NO. | : 11/248057 | |
| DATED | : October 27, 2009 | |
| INVENTOR(S) | : John E. Warnock | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Twelfth Day of October, 2010

David J. Kappos
*Director of the United States Patent and Trademark Office*